US006176914B1

(12) United States Patent
Feustel et al.

(10) Patent No.: US 6,176,914 B1
(45) Date of Patent: Jan. 23, 2001

(54) AROMATIC COMPOUND-FREE SOLVENT FOR PRINTING INKS

(75) Inventors: Dieter Feustel, Monheim; Matthias Fies, Krefeld, both of (DE)

(73) Assignee: Henkel Kommanditgesellschaft auf Aktien, Duesseldorf (DE)

( * ) Notice: Under 35 U.S.C. 154(b), the term of this patent shall be extended for 0 days.

(21) Appl. No.: 08/945,992

(22) PCT Filed: Apr. 26, 1996

(86) PCT No.: PCT/EP96/01770

§ 371 Date: Dec. 4, 1997

§ 102(e) Date: Dec. 4, 1997

(87) PCT Pub. No.: WO96/34920

PCT Pub. Date: Nov. 7, 1996

(30) Foreign Application Priority Data

May 4, 1995 (DE) ............................... 195 16 028

(51) Int. Cl.⁷ ..................................... C09D 11/00
(52) U.S. Cl. .................... 106/31.67; 106/31.86; 106/31.88
(58) Field of Search .................... 106/31.67, 31.86, 106/31.88

(56) References Cited

U.S. PATENT DOCUMENTS

| 3,946,138 | 3/1976 | Jones ...................... 428/514 |
| 4,069,179 | 1/1978 | Jones ...................... 260/23 R |
| 4,097,289 | 6/1978 | Hofmann et al. ............ 106/26 |
| 4,183,685 | 1/1980 | Hofmann et al. ............ 401/202 |
| 4,321,094 | * 3/1982 | Batt et al. ................ 106/31.88 |
| 4,357,164 | * 11/1982 | Tsuji et al. ............... 106/31.67 |
| 4,773,932 | * 9/1988 | Gamblin .................. 106/31.88 |
| 5,178,672 | 1/1993 | Miller ..................... 106/28 R |
| 5,340,493 | 8/1994 | Principato ................ 252/462 |
| 5,508,320 | * 4/1996 | Klemm et al. ............. 106/31.67 |
| 5,622,547 | * 4/1997 | Maslowski et al. ........ 106/31.32 |
| 5,919,292 | * 7/1999 | Arndt ..................... 106/31.03 |

FOREIGN PATENT DOCUMENTS

| 25 12 734 | 10/1976 | (DE) . |
| 43 19 825 | 12/1994 | (DE) . |
| WO95/05424 | 2/1995 | (WO) . |

OTHER PUBLICATIONS

World Surface Coating Abstracts, vol. 63, No. 581: 2065 (1990).
Ullmann's Encyclopedia of Industrial Chemistry A22:143–56(1993).
"Solvent Problems In Industry", G. Kakabadse (ed.), Elsevier, NY, p76 (1984).
Encyclopedia of Chemical Technology 13: 374–98 (1981).

* cited by examiner

Primary Examiner—Mark L. Bell
Assistant Examiner—Veronica F. Faison
(74) Attorney, Agent, or Firm—John E. Drach; Glenn E. J. Murphy; Thomas F. Roland

(57) ABSTRACT

Aromatic compound-free solvent for printing inks, consisting of a solvent mixture characterised in that is contains (a) 80–99% by weight aromatic compound-free mineral oil; (b) 1 to 20% by weight of an ester of a $C_8$–$C_2$ fatty acid with up to 60 C atoms in total; and/or (c) 1 to 20% by weight of a fatty alcohol with 6 to 36 C atoms. Also disclosed are printing inks that contain binders, pigments, aromatic compound-free solvents and optional additives.

33 Claims, No Drawings

AROMATIC COMPOUND-FREE SOLVENT FOR PRINTING INKS

BACKGROUND OF THE INVENTION

1. Field of the Invention

This invention relates to the use of fatty acid derivatives as a substitute for aromatic solvent constituents in solvents for printing inks. The present invention also relates to printing inks containing binders, pigments, non-aromatic solvents and optionally additives.

2. Discussion of the Related Art

Printing products of various kinds can be produced using various printing techniques which may be divided into three main types, namely: letterpress printing, planographic printing (or even offset printing) and gravure printing. In letterpress printing, the printing ink is transferred from hard raised letters, which are covered with a thin layer of ink by rubber rollers, to the substrate. The composition of the printing ink has to be such that it dries relatively slowly and does not begin to harden prematurely. Viscous, very slow-drying printing inks are required for modern high-speed newspaper printing machines using the rotary letterpress process. In offset printing, the design to be reproduced is fixed on printing plates in the form of zones of opposite polarity. The hydrophobic, viscous printing ink only wets the hydrophobic zones on the printing plates. In gravure printing, the motif is engraved into the printing plate. After wetting of the printing plate with the relatively low-viscosity printing ink, the surface is stripped so that printing ink only remains in the engraved depressions from which it is then transferred to the substrate to be printed.

The above examples show that printing inks have to satisfy a number of requirements against the background of economy. The principal components of a printing ink are pigments, binders, solvents and additives with which the required properties of the printing inks can be varied. For example, viscosity, flow behavior and tackiness can be adjusted according to the application envisaged for the printing ink. The various requirements which the physical properties are expected to meet against the background of economy, particularly in the case of mass-produced printed products, impose stringent demands on the solvent used in the printing ink. On the one hand, it must be capable of dissolving various binders and various additives; on the other hand, it must allow viscosity to be adjusted to the required value.

By virtue of their favorable price, mineral oils have been successfully used as solvents for printing inks. However, one disadvantage of these hydrocarbon-based diluents is that their dissolving properties in regard to the binders used are poor. In the case of mineral oil for example, the binder dissolving properties deteriorate with decreasing aromatic content (Ullmann's Encyclopedia of Industrial Chemistry, A 22, 147 (1993)). In practice, therefore, solvents with—in some cases—a high content of aromatic hydrocarbons are used in printing inks to compensate for the poor dissolving properties of the aliphatic hydrocarbons in the mineral oil. In the case of offset printing for example, natural-resin-modified phenolic resins and alkyd resins modified with drying oils are dissolved in high-boiling mineral oils containing 16 to 20% of aromatic hydrocarbons (G. H. Hutchinson in "Solvent Problems in Industry", G. Kakabadse (ed.), Elsevier, N.Y. (1984)). However, the aromatic components in the solvent have an adverse effect both on its toxicology and on its environmental behavior.

The problem addressed by the present invention was to replace the aromatic constituents in solvent mixtures used for the production of printing inks by at least equally effective, but environmentally far safer substances for the reasons explained above.

It has now surprisingly been found that the aromatic constituents in solvents for printing inks can be fully replaced by fatty acid esters and fatty alcohols in various fields of application.

The use of fatty acid esters in printing inks has been known for some time. In particular, the triglycerides of unsaturated fatty acids are used for lithographic printing inks. The most commonly used oils are linseed oil, soybean oil and tall oil (Encyclopedia of Chemical Technology, 13, 381 et seq.). However, the purpose of these additives lies in their function as an oxidatively drying binder. The use of esters of unsaturated fatty acids as solvents in the production of printing inks is not apparent from the relevant works.

DE-A 43 19 825 teaches the use of a cleaning paste for removing residues and printing inks from rubber printing rollers or printing blankets. Besides abrasive components, the cleaning paste contains 10 to 25% of fatty acid esters in the form of methyl and ethyl esters. Soybean oil methyl ester and rapeseed oil methyl ester in particular are expressly mentioned. However, it is not apparent from the document in question that the fatty acid esters would also be suitable for the production of a printing ink and not only in conjunction with abrasives for cleaning inking rollers.

U.S. Pat. No. 5,340,493 is also concerned with the cleaning of printing rollers, blankets and machines. This document discloses cleaning solutions consisting of tall oil alkyl ester, organic solvent and a surfactant. The object of the invention in question was to provide a cleaning solution for parts of printing machines; there is no suggestion anywhere of its use in the production of printing inks.

In DE-C3-25 12 734, a saturated fatty acid ester is added as a release agent to an ink. The object of this is to obtain improved wiping behavior where the ink is applied to non-absorbent surfaces. However, the ink does not contain a mineral oil.

It is known from U.S. Pat. No. 3,946,138 and the associated U.S. Pat. No. 4,069,179 that printing inks used for transfer printing may contain an aliphatic monoalcohol as carrier. Cetyl alcohol, myristyl alcohol and stearyl alcohol are mentioned as examples of such an alcohol. It is apparent both from the description and from the examples that the quantity of alcohol used makes up at least 40% by weight of the ink. Mineral oils are not mentioned.

DESCRIPTION OF THE INVENTION

The present invention relates to the use of a solvent mixture for the production of printing inks, characterized in that the solvent mixture contains a) 1% to 99% by weight of a non-aromatic mineral oil, b) 1% to 99% by weight of fatty acid esters of $C_{8-22}$ fatty acids containing up to 60 carbon atoms, and/or c) 1% to 99% by weight of fatty alcohols containing 6 to 36 carbon atoms.

Preferred is the use of solvent mixtures that contain an excess of a non-aromatic mineral oil relative to the fatty acid esters and/or the fatty alcohols.

Particularly preferred is an embodiment wherein the solvent mixture contains;

a) 80% to 99% by weight of a non-aromatic mineral oil, b) 1% to 20% by weight of fatty acid esters of $C_{8-22}$ fatty acids containing up to 60 carbon atoms and/or c) 1% to 20% by weight of fatty alcohols containing 6 to 36 carbon atoms.

It will be immediately apparent to the expert that the maximum percentage content of non-aromatic mineral oil in the solvent mixture where it is used together with fatty acid esters and fatty alcohols is reduced to at most 98% by weight.

The term "non-aromatic" refers to mineral oils containing no more than 2% by weight of aromatic constituents. However, mineral oils containing less than 1% by weight of aromatic constituents are preferably used, those containing less than 0.5% by weight of aromatic constituents being more particularly preferred.

The mineral oils are present in the solvent mixture used for the production of the printing ink in a percentage by weight of no less than 1% by weight and no more than 99% by weight. Within these limits, the percentage mineral oil content is preferably between 80% and 99% by weight.

The mineral oil used should boil at temperatures in the range from 100 to 350° C. According to the invention, mineral oils boiling at temperatures of 240 to 330° C. are preferably used, those boiling at temperatures of 270 to 310° C. being particularly preferred.

In addition to the described mineral oil, fatty acid esters may be used in order to improve the solubility of the binder. The fatty acid esters are used in a quantity of 1 to 99% by weight, based on the total solvent content. The range from 5% to 50% by weight is particularly preferred, the range from 10% to 30% by weight being most particularly preferred. The acid value of the ester used should not exceed 5 mg KoH/g and is preferably below 3 mg KOH/g, acid values below, 2 mg KoH/g being particularly preferred.

Fatty acid esters suitable for the purposes of the invention include, for example, the esters of dodecenoic acid, decenoic acid, octenoic acid, octadienoic acid, dodecadienoic acid, decadienoic acid, oleic acid, erucic acid, ricinoleic acid, tall oil fatty acid, linoleic acid, stearic acid, palmitic acid, heptadecanoic acid, nonadecanoic acid, isopalmitic acid, oleic acid, caprylic acid, capric acid, lauric acid, myristic acid, arachic acid, linolenic acid and behenic acid. This list is purely exemplary and is not intended to be limiting in any way.

Fatty acid esters of which the fatty acid components are of natural origin are particularly preferred.

The fatty acid esters used in accordance with the invention may be saturated. However, fatty acid esters containing at least one double bond in the fatty acid component are particularly preferred.

According to the invention, it is also possible to use fatty acid esters which are obtainable by transesterification of naturally occurring triglycerides, for example beef tallow, palm oil, peanut oil, rapeseed oil, cottonseed oil, soybean oil, sunflower oil and linseed oil, with corresponding alcohols and which, accordingly, represent a mixture of esters of different natural fatty acids varying in composition. According to the invention, triglycerides with a high content of unsaturated fatty acids are preferred. These include, for example, sesame oil, rapeseed oil, linseed oil, corn oil, cereal seed oil, soybean oil, poppyseed oil, sunflower oil and perilla oil.

Saturated or unsaturated fatty acid esters obtainable by the esterification of derivatives of naturally occurring fatty acids may also be used for the purposes of the invention. For example, the esters of ricinoleic acid, elaidic acid, or pelargonic acid may be used for the purposes of the invention.

The alcohol component of the fatty acid ester may be a monohydric, dihydric or trihydric alcohol. Suitable alcohols are, in particular, monohydric, linear and branched alkanols such as, for example, methanol, ethanol, propanol, isopropanol, butanol, isobutanol, tert.butanol, pentanol, hexanol and their higher homologs. However, unsaturated alcohols, such as allyl alcohol, butenyl alcohol, pentenyl alcohol and their higher homologs up to the fatty alcohols, for example oleyl alcohol and erucyl alcohol, and the diols obtainable by reduction of dimer fatty acids may also be used in accordance with the present invention. Fatty acids esterified with monohydric alcohols, in which the alcohol component contains 1 to 6 carbon atoms and more particularly 1 to 4 carbon atoms, are preferably used.

In addition to or instead of the fatty acid esters, fatty alcohols containing 6 to 36 carbon atoms may also be used for solving the problem addressed by the present invention. In the same way as the fatty acid esters, they are added to the mineral oil in quantities of 1 to 99% by weight and preferably in quantities of 5% to 50% by weight, the best results being obtained with quantities in the range from 10% to 30% by weight.

Fatty alcohols suitable for use in accordance with the invention are, for example, dodecanol, decanol, octanol, octenol, dodecenol, decenol, octadienol, dodecadienol, decadienol, oleyl alcohol, erucyl alcohol, ricinoleyl alcohol, stearyl alcohol, palmityl alcohol, lauryl alcohol, myristyl alcohol, arachidyl alcohol, capryl alcohol, capric alcohol, linoleyl alcohol, linolenyl alcohol and behenyl alcohol. This list is purely exemplary and is not intended to be limiting in any way.

The method by which the fatty alcohol is prepared is not important to its use in accordance with the invention. However, the fatty alcohols preferably emanate from fatty acids and are normally obtained from the esters of the fatty acids by reduction.

Fatty alcohols obtainable by esterification and reduction of naturally occurring fatty acids are particularly preferred for the purposes of the invention.

The fatty alcohols used in accordance with the invention may be saturated. However, those containing at least one double bond are preferably used.

It is also possible in accordance with the invention to use fatty alcohols which are obtained by reduction of naturally occurring triglycerides, such as beef tallow, palm oil, peanut oil, rapeseed oil, cottonseed oil, soybean oil, sunflower oil and linseed oil, or fatty acid esters formed from transesterification products thereof with corresponding alcohols and which therefore represent a mixture of various fatty alcohols.

Saturated or unsaturated fatty alcohols obtainable by esterification and reduction of derivatives of naturally occurring fatty acids may also be used for the purposes of the invention. For example, ricinoleyl alcohol, elaidyl alcohol or pelargonyl alcohol may be used in accordance with the invention.

One characteristic of the present invention is that the fatty acid esters and the fatty alcohols are used either individually or in combination in the mixture with non-aromatic mineral oil, with the proviso that one of the two components must be present.

In one preferred embodiment of the invention, the components of the solvent mixture are selected so that the solvent mixture is liquid at 20° C.

The present invention also relates to printing inks containing binders, pigments and a solvent mixture containing a) 1% to 99% by weight of a non-aromatic mineral oil, b) 1 to 99% by weight of fatty acid esters of $C_{8-22}$ fatty acids with a total of up to 60 carbon atoms and/or c) 1 to 99% by weight of fatty alcohols containing 6 to 36 carbon atoms.

They may optionally contain other ingredients, such as surfactants, fillers, stabilizers, siccatives and flow improvers.

Suitable binders are resins known per se such as, for example, shellac, rosin, phenol-modified rosin, polyamides, phenolic resins, polyurethanes, polyepoxides, cellulose, nitrocellulose and, preferably, alkyd resins.

Offset, transfer, planographic, letterpress and/or gravure printing inks can be produced with the solvent mixture according to the invention in conjunction with the usual components.

EXAMPLES

In the following Examples, all percentages are by weight, unless otherwise indicated.

Example 1
Production of a Gravure Printing Ink

100 Parts of a pigment base (Hacolor P.Y. 13) together with 100 parts of a commercial drying alkyd resin based on soybean oil (isophthalic acid, trimethylol propane, 1500 dPa.s, 20° C.), 10 parts of cobalt octoate containing 6% cobalt, 20 parts of a micronized polyethylene wax, 320 parts of a phenol-modified rosin, 400 parts of a non-aromatic mineral oil and 40 parts of a linseed oil fatty acid propyl ester are ground on a three-roll stand.

Comparison Example

In the composition mentioned above, the 400 parts of non-aromatic mineral oil and 40 parts of linseed oil fatty acid propyl ester are replaced by 440 parts of a mineral oil containing 18% of aromatic hydrocarbons (boiling range 270–310° C., aniline point 72° C.).

The inks were compared for their printing properties. In every case, the layer of printing ink applied amounted to 1.5 g/m²±5%.

Example 2
Production of an Offset Printing Ink

100 Parts of furnace black, 10 parts of a micronized polyethylene wax, 35 parts of a commercial drying alkyd resin based on soybean oil (isophthalic acid, trimethylol propane, 1500 dPa.s, 20° C.), 2 parts of cobalt octoate containing 6% cobalt, 65 parts of a phenol-modified rosin, 50 parts of gilsonite asphalt, 200 parts of a non-aromatic mineral oil, 10 parts of octadecenol and 30 parts of rapeseed oil fatty acid propyl ester were melted at 200° C. and ground on a three-roll stand.

Comparison Example

In the above composition, the 200 parts of non-aromatic mineral oil, 30 parts of rapeseed oil fatty acid propyl ester and 10 parts of octadecenol were replaced by 240 parts of a mineral oil containing 18% of aromatic hydrocarbons (boiling range 270–310° C., aniline point 72° C.). The components were melted at 200° C. and ground on a three-roll stand.

The inks were applied to newsprint (52 g/m²) by rotary printing and compared for their printing properties. In every case, the layer of printing ink applied amounted to 1.5 g/m²±5%.

Example 3
Production of a Transfer Printing Ink

150 Parts of Dispers-Red 60, 50 parts of Dispers-Blue 331, 200 parts of a drying alkyd resin based on linseed oil isophthalic acid, 10 parts of cobalt octoate, 250 parts of a phenol-modified rosin, 300 parts of a non-aromatic mineral oil, 25 parts of octadecenol and 25 parts of oleic acid propyl ester were ground on a three-roll stand.

Comparison Example

Instead of 300 parts of a non-aromatic mineral oil, 25 parts of octadecenol and 25 parts of oleic acid propyl ester, 350 parts of a mineral oil containing 18% of aromatic hydrocarbons and having an aniline point of 72° C. (boiling range 270 to 310° C.) were added as solvent to the above components. The resulting transfer printing ink was applied in a layer thickness of 1.5 g/m² and, immediately after printing, was transferred and compared with the above ink for printing behavior. In every case, the printing ink was applied in a layer thickness of 1.5 g/m²±5%.

We claim:

1. A method of preparing a printing ink comprising the step of adding to the printing ink a solvent mixture comprising:

(a) 1% to 99% by weight of a non-aromatic mineral oil;
    (b) 1% to 99% by weight of a $C_8$ to $C_{22}$ fatty acid ester having up to 60 carbon atoms; and
    (c) 1% to 99% by weight of a $C_6$ to $C_{36}$ fatty alcohol.

2. A method according to claim 1, wherein the solvent mixture comprises 80% to 99% by weight of the non-aromatic mineral oil, 1% to 20% by weight of the fatty acid ester and 1% to 20% by weight of the fatty alcohol.

3. A method according to claim 1, wherein the solvent mixture comprises 5% to 50% by weight of the fatty acid ester and 5% to 50% by weight of the fatty alcohol.

4. A method according to claim 3, wherein the solvent mixture comprises 10% to 30% by weight of the fatty acid ester and 10% to 30% by weight of the fatty alcohol.

5. A method of preparing a printing ink comprising the step of adding to the printing ink a solvent mixture consisting essentially of:

(a) 1% to 99% by weight of a mineral oil that contains no more than 2% by weight of the oil of aromatic constituents and has a boiling point of 100° C. to 350° C.;
    (b) 1% to 99% by weight of a $C_8$ to $C_{22}$ fatty acid ester having up to 60 carbon atoms and an acid value not exceeding 5 mg KOH/g; and
    (c) 1% to 99% by weight of a $C_6$ to $C_{36}$ fatty alcohol.

6. A method according to claim 5, wherein the solvent mixture consists essentially of:

(a) 80% to 99% by weight of the mineral oil, which contains no more than 1% by weight of the oil of aromatic constituents and has a boiling point of 240° C. to 330° C.;
    (b) 5% to 50% by weight of the ester, which has an acid value not exceeding 3 mg KOH/g; and
    (c) 5% to 50% of the fatty alcohol.

7. A method according to claim 6, wherein the solvent mixture consists essentially of:

(a) 80% to 99% by weight of the mineral oil, which contains no more than 0.5% by weight of the oil of aromatic constituents and has a boiling point of 270° C. to 310° C.;
    (b) 10% to 30% by weight of the ester, which has an acid value not exceeding 2 mg KOH/g; and
    (c) 10% to 30% of the fatty alcohol.

8. A method of preparing a printing ink comprising the step of adding to the printing ink a solvent mixture consisting essentially of:

(a) 80% to 99% by weight of a mineral oil that contains no more than 2% by weight of the oil of aromatic constituents and has a boiling point of 100° C. to 350° C.;
    (b) 1% to 20% by weight of a $C_8$ to $C_{22}$ fatty acid ester having up to 60 carbon atoms and an acid value not exceeding 5 mg KOH/g; and
    (c) 1% to 20% by weight of a $C_6$ to $C_{36}$ fatty alcohol.

9. A method according to claim 8, wherein the solvent mixture consists essentially of:
(a) 80% to 99% by weight of the mineral oil, which contains no more than 1% by weight of the oil of aromatic constituents and has a boiling point of 240° C. to 330° C.;
(b) 5% to 20% by weight of the fatty acid ester, which has an acid value not exceeding 3 mg KOH/g; and
(c) 5% to 20% by weight of the fatty alcohol.

10. A method according to claim 9, wherein the solvent mixture consists essentially of:
(a) 80% to 99% by weight of the mineral oil, which contains no more than 0.5% by weight of the oil of aromatic constituents and has a boiling point of 270° C. to 310° C.;
(b) 10% to 20% by weight of the fatty acid ester, which has an acid value of not exceeding 2 mg KOH/g; and
(c) 10% to 20% by weight of the fatty alcohol.

11. A method according to claim 8, wherein the ester is a fatty acid ester of an acid selected from the group consisting of dodecenoic acid, decenoic acid, octenoic acid, octadienoic acid, dodecadienoic acid, decadienoic acid, oleic acid, erucic acid, ricinoleic acid, tall oil fatty acid, linoleic acid, stearic acid, palmitic acid, heptadecanoic acid, nonadecanoic acid, isopalmitic acid, oleic acid, caprylic acid, capric acid, lauric acid, myristic acid, arachic acid, linolenic acid, behenic acid, elaidic acid, and pelargonic acid with a monohydric, dihydric, or trihydric alcohol.

12. A method according to claim 8, wherein the alcohol component of the fatty acid ester is selected from the group consisting of methanol, ethanol, propanol, isopropanol, butanol, isobutanol, tert-butanol, pentanol, hexanol, allyl alcohol, butenyl alcohol, pentenyl alcohol, oleyl alcohol, and erucyl alcohol.

13. A method according to claim 8, wherein the alcohol component of the fatty acid ester is a $C_1$ to $C_6$ monohydric alcohol.

14. A method according to claim 8, wherein the ester is a mixture of fatty acid esters obtained by transesterification of a naturally occurring triglyceride selected from the group consisting of beef tallow, palm oil, peanut oil, rapeseed oil, cottonseed oil, soybean oil, sunflower oil, linseed oil, sesame oil, corn oil, cereal seed oil, poppyseed oil, and perilla oil.

15. A method according to claim 8, wherein the fatty alcohol is selected from the group consisting of dodecanol, decanol, octanol, octenol, dodecenol, decenol, octadienol, dodecadienol, decadienol, oleyl alcohol, erucyl alcohol, ricinoleyl alcohol, stearyl alcohol, palmityl alcohol, lauryl alcohol, myristyl alcohol, arachidyl alcohol, capryl alcohol, capric alcohol, linoleyl alcohol, linolenyl alcohol and behenyl alcohol.

16. A method according to claim 8, wherein the ester is a fatty acid ester of a fatty acid of natural origin having at least one carbon-carbon double bond and a $C_1$ to $C_4$ monohydric alcohol, and the fatty alcohol is a reduction product of a naturally occurring triglyceride.

17. A printing ink comprising a pigment, a binder, and a solvent mixture consisting essentially of:
(a) 1% to 99% by weight of a mineral oil that contains no more than 2% by weight of the oil of aromatic constituents and has a boiling point of 100° C. to 350° C.;
(b) 1% to 99% by weight of a $C_8$ to $C_{22}$ fatty acid ester having up to 60 carbon atoms and an acid value not exceeding 5 mg KOH/g; and
(c) 1% to 99% by weight of a $C_6$ to $C_{36}$ fatty alcohol.

18. A printing ink according to claim 17, wherein the solvent mixture consists essentially of:
(a) 80% to 99% by weight of the mineral oil, which contains no more than 1% by weight of the oil of aromatic constituents and has a boiling point of 240° C. to 330° C.;
(b) 5% to 50% by weight of the fatty acid ester, which has an acid value not exceeding 3 mg KOH/g; and
(c) 5% to 50% by weight of the fatty alcohol.

19. A printing ink according to claim 18, wherein the solvent mixture consists essentially of:
(a) 80% to 99% by weight of the mineral oil, which contains no more than 0.5% by weight of the oil of aromatic constituents and has a boiling point of 270° C. to 310° C.;
(b) 10% to 30% by weight of the fatty acid ester, which has an acid value not exceeding 2 mg KOH/g; and
(c) 10% to 30% by weight of the fatty alcohol.

20. A printing ink according to claim 17, wherein the solvent mixture is liquid at 20° C.

21. A printing ink according to claim 17, wherein the fatty acid ester is a product of the transesterification of a naturally occurring triglyceride with a monohydric, dihydric, or polyhydric alcohol.

22. A printing ink according to claim 21, wherein the fatty acid component of the fatty acid ester contains at least one carbon-carbon double bond.

23. A printing ink according to claim 17, wherein the fatty alcohol is a product of the reduction of a naturally occurring triglyceride.

24. A printing ink comprising a pigment, a binder, and a solvent mixture consisting essentially of:
(a) 80% to 99% by weight of the mineral oil, which contains no more than 0.5% by weight of the oil of aromatic constituents and has a boiling point of 270° C. to 310° C.;
(b) of 1% to 20% by weight of the fatty acid ester, which has an acid value not exceeding 2 mg KOH/g; and
(c) 1% to 20% by weight of the fatty alcohol.

25. A printing ink according to claim 24, wherein the solvent mixture is liquid at 20° C.

26. A printing ink according to claim 24, wherein the fatty acid ester is a product of the transesterification of a naturally occurring triglyceride with a $C_1$ to $C_6$ monohydric alcohol.

27. A printing ink according to claim 24, wherein the fatty acid ester is a product of the transesterification of a naturally occurring triglyceride with a $C_1$ to $C_4$ monohydric alcohol.

28. A printing ink according to claim 24, wherein the fatty acid ester is a product of the transesterification of a naturally occurring triglyceride selected from the group consisting of beef tallow, palm oil, peanut oil, rapeseed oil, cottonseed oil, soybean oil, sunflower oil, linseed oil, sesame oil, corn oil, cereal seed oil, poppyseed oil and perilla oil with an alcohol selected from the group consisting of methanol, ethanol, propanol, isopropanol, butanol, isobutanol, tert-butanol, pentanol, hexanol, allyl alcohol, butenyl alcohol, pentenyl alcohol, oleyl alcohol, erucyl alcohol, and diols obtained by reduction of dimer fatty acids.

29. A printing ink according to claim 24, wherein the fatty alcohol is a product of the reduction of a naturally occurring triglyceride.

30. A printing ink according to claim 29, wherein the fatty alcohol has at least one carbon-carbon double bond.

31. A printing ink according to claim 29, wherein the naturally occurring triglyceride is selected from the group consisting of beef tallow, palm oil, peanut oil, rapeseed oil, cottonseed oil, soybean oil, sunflower oil, and linseed oil.

32. A printing ink according to claim 29, wherein the fatty alcohol is selected from the group consisting of dodecanol, decanol, octanol, octenol, dodecenol, decenol, octadienol, dodecadienol, decadienol, oleyl alcohol, erucyl alcohol, ricinoleyl alcohol, stearyl alcohol, palmityl alcohol, lauryl alcohol, myristyl alcohol, arachidyl alcohol, capryl alcohol, capric alcohol, linoleyl alcohol, linolenyl alcohol, behenyl alcohol, elaidyl alcohol, and pelargonyl alcohol.

33. A method of preparing a printing ink comprising the step of adding to the printing ink a solvent mixture comprising 1% to 99% by weight of a non-aromatic mineral oil and 1% to 99% by weight of a $C_6$ to $C_{36}$ fatty alcohol.

* * * * *